United States Patent [19]
Dycks

[11] 3,952,126
[45] Apr. 20, 1976

[54] RESILIENT CARPET PADDING SHEET
[76] Inventor: Christian C. Dycks, 11957 Droxford, Artesia, Calif. 90701
[22] Filed: Mar. 20, 1975
[21] Appl. No.: 560,203

[52] U.S. Cl. ............................. 428/235; 428/237; 428/283; 428/372; 156/148
[51] Int. Cl.² ..................... B32B 5/06; B32B 5/16; B32B 11/02; D04H 1/46
[58] Field of Search ........... 428/234, 235, 237, 227, 428/240, 372, 283; 156/148

[56] References Cited
UNITED STATES PATENTS
| | | | |
|---|---|---|---|
| 3,451,885 | 6/1969 | Klein | 428/234 X |
| 3,752,721 | 8/1973 | Clark et al. | 156/148 |
| 3,873,388 | 3/1975 | Hunter et al. | 156/148 |

Primary Examiner—Philip Dier
Attorney, Agent, or Firm—Georges A. Maxwell

[57] ABSTRACT

A substantially non-compacting carpet padding of controlled resiliency in flat sheet form comprising a mixture of staple fibers having lower indexes of resiliency and memory than is desired for such padding and flexible foam plastic granules having a greater index of resiliency than is desired for such padding and having a high index of memory, said fibers and granules being interengaged and interrelated whereby the fibers are acted upon by the granules to compensate for their lack of resiliency and memory and the granules are acted upon by the fibers to buffer and to compensate for their excess of resiliency.

7 Claims, 7 Drawing Figures

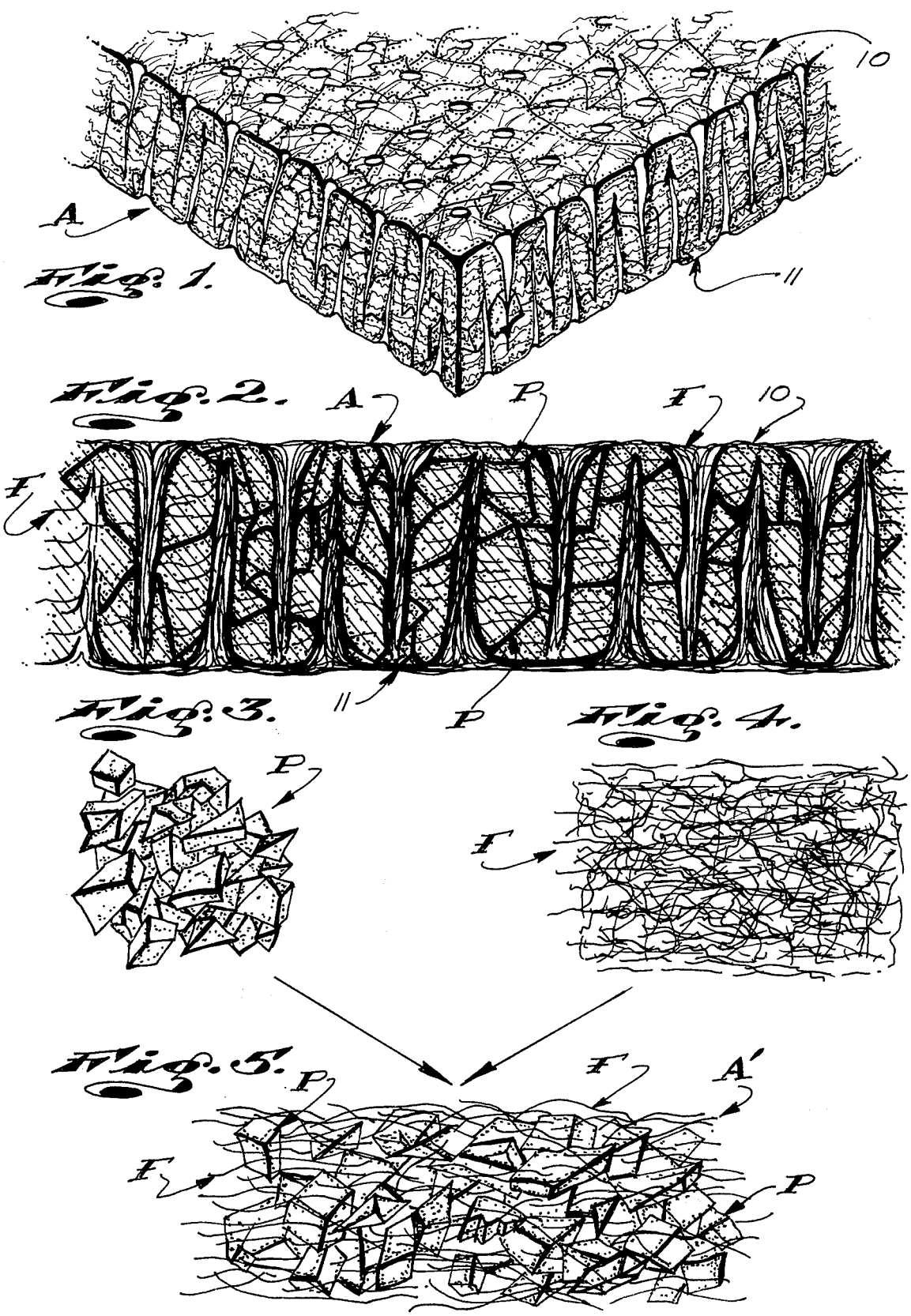

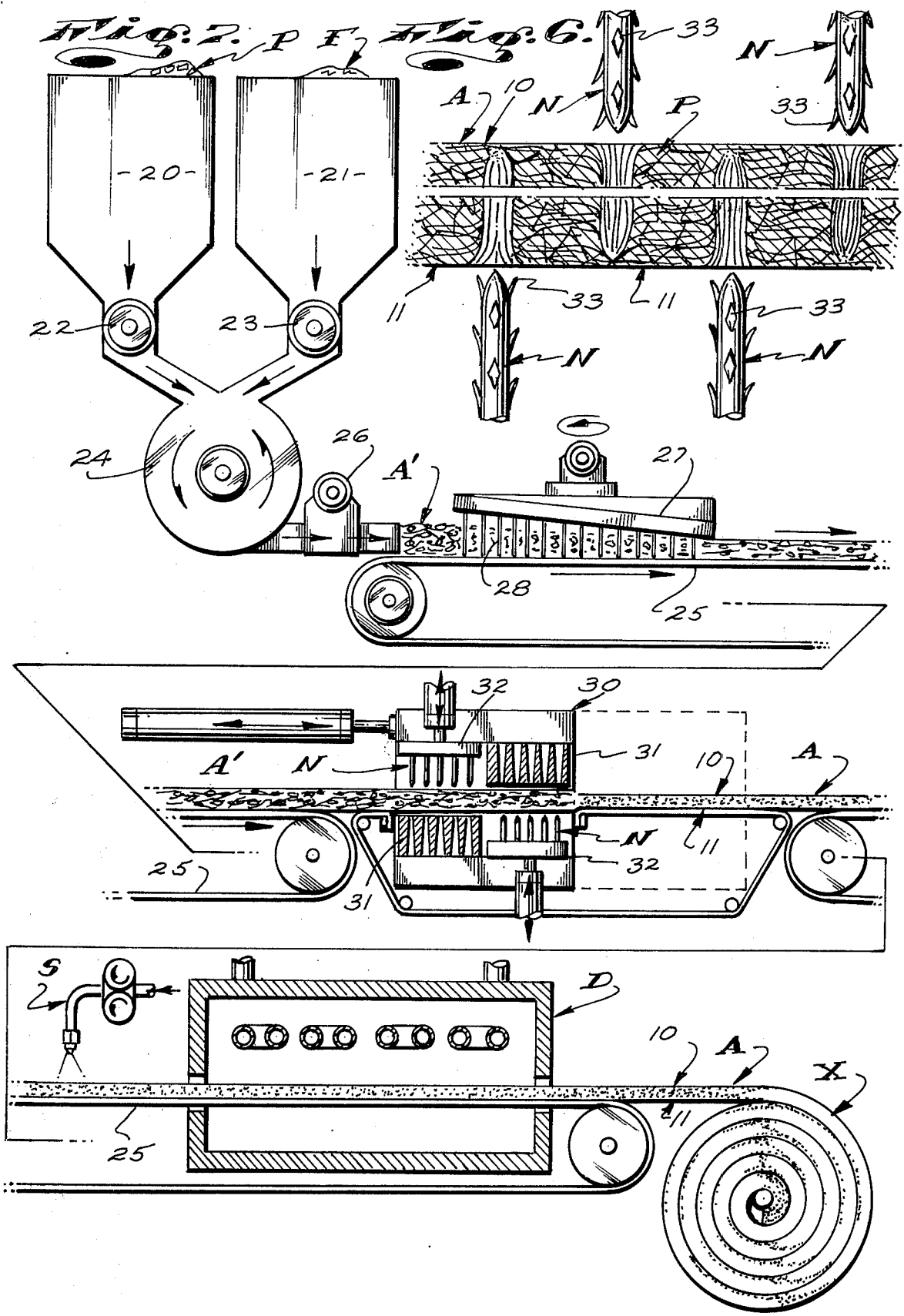

RESILIENT CARPET PADDING SHEET

This invention has to do with carpet padding and is more particularly concerned with a novel carpet padding structure composed of intermingled and interconnected staple fibers and resilient foam plastic granules.

The carpet padding which is the subject of this invention is that form or type of rather thick, soft, resilient sheet material or composition which is laid between a floor and a carpet to provide increased heat and sound insulation and a soft cushion upon which the carpet rests, to enhance the wear or life expectancy of the carpet and to enhance the softness, under foot, sought to be afforded by the carpet.

The establishment of carpet padding of staple fiber materials, such as jute fibers, has long been practiced. The principal shortcoming to be found in such padding is that the padding tends to become set in a compacted condition when subjected to constant or intermittently applied compressive forces. Such compaction and setting is due to the fact that the fibers used in establishing such padding, due to economic necessity, are of a low quality and have limited resiliency and normally poor memory.

It has been found that the use of staple fibers with more desirable and effective memory and resiliency and which would establish padding which will not readily become compacted and resiliently dead is so costly that its use in such padding is economically impractical and/or prohibitive.

Another, more modern form of carpet padding is sheet material established of soft, resilient, porous or foam-like plastic material, such as blown or foamed polyurethane, polyvinyl chloride, or one of the synthetic rubber type plastics.

It has been found that very satisfactory foam plastic carpet padding can be established of unitary sheets of foam or porous plastic in which the density of the material, its shore hardness and resulting resilience and its memory characteristics are suitably adjusted and set.

The principal shortcoming to be found in foam plastic padding, as set forth above, resides in the high cost of the raw materials and necessary considerable amount of weight of such materials required to establish an effective padding. Such weight and cost factors have resulted in the conclusion that unitary integral sheets of foam plastic, specially established for use as carpet padding are economically impractical and/or economically prohibitive.

As a result of the above, it has become common practice to establish sheets of foam plastic carpet padding from granules, bits and pieces of waste foam plastic stock which is collected from various other industrial and/or manufacturing operations. In establishing such foam plastic padding, the collected waste material is first shredded to establish granules of resilient, porous or foam plastic of desired, substantially uniform size. The shredded plastic or plastic granules are thereafter laid out or spread as desired and bonded together by a suitable cement, solvent or as by heat, to establish the desired sheet of padding.

Such foam plastic carpet padding, established of waste materials, while wanting in many respects, is functionally acceptable and is economically feasible and practical. Such padding is presently finding wide, general acceptance and use.

The principal shortcoming in waste stock foam plastic carpet padding resides in the fact that the waste materials employed are primarily derived from scraps of foam plastic padding employed in mattresses, upholstered furniture and the like. Such foam plastic is, as a general rule, far softer and more resilient than is desired in the establishment of a carpet padding of desired resiliency and softness. Further, its memory characteristics are excellent and when coupled with its resiliency, tends to impart into a carpet padding, excessive bounce or springiness. Such is particularly true when such padding is made sufficiently thick so as not to become completely compacted and to bottom out when walked upon. Accordingly, and to overcome the undesirable springiness of such foam plastic padding, it is often made sufficiently thin that it does and will substantially completely compact and bottom out when walked upon, but only to the extent necessary to avoid the sense or feeling of excessive resiliency. Such practice is at best a compromise between effective desirable padding of carpet and the undesirable characteristic (for use as carpet padding) inherent in the materials employed.

The prior art has taught and proposed laminate sheet padding material wherein layers or sheets of resilient foam plastic padding and of staple fibers are arranged and fixed together in juxtaposition, with the purported end of providing a sheet of padding which affords the desirable characteristics and/or attributes of the two forms or types of materials.

So far as is known, or as can be determined by me at this time, laminated foam plastic and staple fiber padding such as noted above is not widely used and has attained indeterminable commercial success as carpet padding.

Samples of laminated foam plastic and staple fiber carpet padding have been made and tested. It has been found that while such padding affords certain of the desirable characteristics of each of the two forms of padding which go to make it up, the undesirable characteristics of each remains and has effect. That is, the foam plastic is still too springy or bouncy and the fibrous padding still compacts and becomes dead.

An object and feature of my invention is to provide a new and improved carpet padding established of soft, resilient foam plastic and of staple fibers and which is such that the foam plastic and the staple fibers are so interconnected and interrelated as to interact and enhance and/or alter the physical characteristics of each.

It is another object and feature of my invention to provide a padding of the character referred to which includes and utilizes readily available, inexpensive staple fibers and readily available inexpensive shreaded particles or granules of foam plastic waste and a padding in which the staple fibers and plastic granules are both intermixed and interengaged to establish a durable integrated, unitary sheet structure.

It is a further object of my invention to provide a flat horizontal sheet of intermixed and commingled staple fibers and particulate resilient foam plastics wherein the fibers extend generally and/or principally horizontally throughout the mixture, about and between the particles and wherein a portion of the fibers are turned and engaged into, through and between related particles and fibers to establish interlocking and/or gripping engagement therewith.

Another object and feature of my invention is to provide a carpet padding of the character referred to above wherein adjacent contacting fibers are secured together by a suitable cement or bonding agent.

It is a further object of the present invention to provide a padding of the general character referred to above wherein adjacent contacting plastic particles are secured together by cement or are fused together.

Still another object of this invention is to provide a carpet padding of the character referred to wherein the adjacent contacting fibers and the plastic particles or granules are bonded and/or fused together.

A primary object and feature of my invention is to provide carpet padding of the general character referred to above wherein staple fibers of limited resiliency and poor memory are yieldingly supported and reinforced by adjacent and related granules of foam plastic granules with superior memory and greater resiliency and wherein the resiliency of the granules is buffered by the fibers related thereto whereby the desirable physical attributes of the two materials are imparted into the resulting carpet padding and the undesirable physical attributes of said materials are substantially reduced and/or eliminated in the resulting padding.

It is an object and feature of the present invention to provide a carpet padding of the character referred to wherein the quantity and/or weight of staple fibers and of granular foam plastic required to be employed to attain desired functional effect is less than the quantity and/or weight of those materials required to establish padding with comparable desired functional effect and established of but one or the other of said materials.

Finally, it is an object and feature of my invention to provide an improved carpet padding of the character referred to which is such that it is easy and economical to make and is such that it can be effectively established in substantial accordance with standard procedures and manufacturing techniques employed in the manufacture of carpet padding, utilizing existing carpet padding manufacturing equipment.

The foregoing and other objects and features of the invention will be understood and will be apparent from the following detailed description of a preferred form and carrying out of the invention, throughout which description reference is made to the accompanying drawings, in which:

FIG. 1 is an isometric view of a corner of a sheet of padding embodying the present invention;

FIG. 2 is an enlarged detailed transverse sectional view of the padding structure shown in FIG. 1;

FIGS. 3 and 4 are views illustrating the form of the materials employed to construct my new carpet, before they are combined;

FIG. 5 is a view showing the materials illustrated in FIGS. 3 and 4, combined;

FIG. 6 is a sectional view illustrating the step of needling employed in the method of constructing my new padding; and FIG. 7 is a diagrammatic view of apparatus employed and illustrating the method steps performed in constructing my new padding.

Referring to FIGS. 1 and 2 of the drawings, the carpet padding A that I provide is a flat, horizontal unitary or integrated sheet having substantially flat top and bottom surfaces 10 and 11.

The sheet can be established in various widths and can be made in length of predetermined limited longitudinal extent, or in a continuous strip, depending upon the capacity of the equipment used in its manufacture.

The padding structure is basically characterized by and includes a mixture comprising a desired weight and volume of particulate or granular, soft, resilient, porous, foam plastic P (see FIG. 3 of the drawings) and a desired weight and volume of staple fibers F (see FIG. 4 of the drawings). The plastic particles P and fibers F are first randomly mixed and/or commingled together and the mixture is spread or distributed and supported to establish a loose unintegrated sheet A', as shown in FIGS. 5 and 7 of the drawings. The sheet A' is next worked upon to turn, direct and urge some or a portion of the fibers F within the mass of commingled plastic particles and fibers into locking and/or holding interengagement with the other adjacent and related fibers of the sheet and/or to engage in and/or through one or more adjacent related plastic particles.

The moving and directing of said portion of the fibers into locking and/or holding engagement with other fibers and with the plastic particles is effected by that mechanical method or operation referred to as "needling", which will hereafter be described. The resulting structure can be said to be "needled" and such that some of the fibers are in locked holding engagement with other fibers and in locked or holding about and/or through plastic particles.

Needling of the sheet A', as noted above, results in the uniting and integrating of the materials and establishes the padding A.

The foregoing constitutes the basic invention that I provide. In practice, to establish or construct a most stable, effective and desirable carpet padding A, particular or specific details regarding the materials employed, the manner in which they are to be worked upon and the like are taken into consideration and the work performed in the construction of the padding is adjusted or varied accordingly.

The bulk or major portion of the staple fibers F that are employed in carrying out the present invention are preferably from ¾ to 4 inches long and are preferably from 3 to 20 denier. They need not be straight and are preferably somewhat crimped throughout their longitudinal extent. The fibers are preferably quite flexible, are rather resilient and need have limited memory. The fibers are of such a nature that they reasily lend themselves to being felted into sheet form by either air or water felting techniques.

In practice, for practical and economic reasons, jute fibers are preferred. Staple jute fiber stock is readily available in substantially uniform, predeterminable, denier, fiber length and flexibility; is quite suitable for felting and, most important, is extremely inexpensive. The principal shortcoming of jute fiber, for use in carpet padding, is that it has poor memory which causes it to return from a flexed position or condition to a normal set position or condition, slowly, and which causes it to reestablish new set positions upon each successive flexure. The above noted slow movement or response, from flexure to set condition, of such fiber is desirable in carpet padding as it does not impart excessive spring or bounce effect in the resulting padding. The poor memory of such fiber, on the other hand, is very undesirable as it tends to permit the padding to become compacted and dead or lifeless, prematurely.

While jute fiber is preferred, it will be apparent that many other natural or manufactured stable fibers can be effectively used in place of or in combination with jute fiber in carrying out my invention. For example, hemp fibers, animal hair or synthetic, cellulose acetate or polymeric resin fibers might be used in place of or in combination with jute fibers without departing from the spirit of the present invention.

The soft, resilient, porous, foam plastic granules or particles P are established of foam polymeric resin, such as polyurethane or polyvinylchoride. These two plastics are the two most commonly used polymeric resins employed to establish soft resilient padding material having physical characteristics which are suitable for the establishing of carpet padding and which are available in the form of waste in sufficient quantities and at a cost which is necessary and practical for the effective practicing of my invention.

The plastic particles P can be one or the other or a combination of both of the above noted polymeric foam or porous resins.

The plastic particles P are established of waste plastic stock obtained from other manufacturing operations. The waste is worked upon by a suitable shredder means (not shown) and is reduced to granules, bits and pieces or particles or random, irregular shapes and of substantially uniform size. More particularly, the plastic is shredded to fall within an effective range of particle sizes. For example, it is preferred that the bulk and major portion of the particles be in a range of from ¼ to 9/16 inches with respect to their mean or average cubic dimensions. The presence of a limited number of over or undersize particles is not objectionable.

In practice, while in some circumstances it is necessary or desirable that the plastic particles be established of only one kind of plastic, particles of different plastics can generally be advantageously mixed and combined in carrying out my invention.

In regard to the above, when a cement or solvent is used to secure the particles together in a pad or when the particles are welded together by heat, one plastic should be used and the combining or different plastics should be avoided, as different plastics are likely to be incompatible with each other or with the cement or solvent used to effect the desired bonding, or welding together of the particles. In the instant case, since the plastic particles are mechanically locked, tied or secured together by the fibers, the problems of compatibility, alluded to above, are eliminated and the mixing together of different plastics can normally be effected without regard to their chemcial characteristics.

It is to be further particularly noted that the plastic particles P can be interconnected or noninterconnected cellular plastic bodies and have high indexes of resiliency, elasticity and memory with respect to the fibers F.

Referring to FIG. 7 of the drawings, in one preferred method of manufacturing my new pad, a loose supply of plastic particles P and a loose supply of fibers F can be deposited into a pair of hoppers 20 and 21 with metering dispensing means 22 and 23. The dispensing means 22 and 23 feed predetermined volumes of particles and fibers into a mixer or blender 24. The mixed, blended or commingled particles and fibers are moved from the blender 24 and are spread out onto a traveling belt or conveyor 25, at a predetermined rate and volume by a spreader means 26. The mixture deposited and spread onto the conveyor 26 is in a loose random relationship having considerable loft and such that many of the fibers are disposed or extend vertically in the mixture.

The mixture spread and deposited on the belt 25 is next, preferably (though not necessarily), initially, partically compacted, flattened or settled downwardly so as to urge the greater portion of the fibers into a substantially horizontal disposition in the mass, reduce its loft and establish a more uniform, stable sheet. Settling and flattening the mass is effected by an inclined screed plate 27 spaced above the belt 25 downstream of the means 26, which plate is preferably motor driven orbitally in a horizontal plane to enhance settling and horizontal dispositioning of the fibers.

In practice, and as illustrated in the drawings, the plate 27 can be provided with substantially vertical, horizontally spaced, fine, resilient wire tines 28 about which the mass is moved and which serve to comb and cause a desired portion of the fibers to extend longitudinally and horizontally in and through the mass.

Alternatively, it is believed more effective and desirable that instead of the above noted tines 28, the screed plate 27 be provided with a plurality of jets (not shown), connected with a suitable source of high pressure air or stream and which directs high pressure columns of air or steam (which can be considered illustrated by the previously noted tines 28) into and through the mass of material as it moves beneath the plate 27. Such streams effect the necessary movement and rearrangement of fibers in the mass to attain desired horizontal dispositioning of the fibers and, at the same time, work to compact the mass, supplementing the action of the plate 27. Such columns of air or steam also tend to prevent horizontal displacement and separating of the mass as might otherwise be caused by the suggested tines or by the plate itself.

In furtherance of the above, it is preferred that steam be employed, as the moisture and heat associated therewith tends to soften and permit the fibers to move or yield and to adapt and/or settle into a new and desired set in the mass, as it is worked upon.

After the preliminary or partially prepared batt or sheet A' is established in the above manner, it is advanced by the conveyor 25 to a suitable needle felting or needle punching means or machine 30, such as manufactured by James Hunter Machine Company, North Adams, Mass. Such machines are characterized by perforated platens 31 which serve to support and back a related fiber (felted) batt and heads 32 shiftable relative to the platens and carrying a plurality of needles N carried by the head to register with the apertures in the platens and adapted to be advanced through and to punch the batt and enter the apertures when the heads are shifted toward the platens. The needles N are pointed and are provided with a plurality of circumferentially and longitudinally spaced fiber hooking or engaging barbs 33. The needles N punch the batt A' and at the same time hook certain or a portion of the fibers adjacent thereto and draw portions of said fibers into and/or through the batt. That is, the needles serve to turn in and draw the fibers into and/or through the punches in the batt which punches extend into and through the resilient foam plastic particles P and through the mass of felted, primarily horizontally disposed fibers adjacent to and defining the punches.

In practice, the needle punch means can be a single head unit which serves to punch the batt A' from one side or surface or can, as diagrammatically illustrated, be a double head mechanism which serves to punch the batt from both sides or surfaces.

The number of needles and the number of punches established in the batt A' is subject to variations and can be adjusted as desired or as circumstances require.

Further, the depth to which the batt A' is punches can be varied, as desired. The depth of the punches and/or the number of punches determines to a great extent, the density of the resulting pad A, as well as the strength or integrity of the pad.

In practicing the present invention, the depth and number of punches depends upon the relative quantities of fiber F and particles P, the loft of the batt A' and the desired density and integrity of the finished pad A.

In practice, the number of punches in the batt could be as low as 50 or 100 per square inch or might be as many as 400 per square inch.

The thickness of the sheet, upon being needled, can be compressed more than 50 percent. Accordingly, for example, if it is desired to establish a padding A, ¾ inch thick, the batt A' is established at 1½ inch thick and the needle punch is adjusted and set so that the 1½ inch thick batt A' is compressed 50% and the resulting pad A is ¾ inch thick Further, by varying the relative volumes or weight of fibers F and particles P, as well as the length and size thereof, and by corresponding adjustment of the spreading means and punching means, the density of the resulting pad A can be varied and adjusted as desired.

The manner in which the fibers of a felted batt are interengaged to establish an integrated sheet by needle punching, as described above, is well known to those skilled in the art to which the instant invention relates.

In the instant invention, it is novel and is to be particularly noted that upon needle punching the batt A', fibers are drawn into and through the resilient plastic particles and are yieldingly gripped or held in and by the particles. Further, fibers are drawn into holding engagement with and about the particles. The plastic particles yieldingly hold and support the fibers related to them and the fibers hold, support and reinforce the particles. The particles enhance the resiliency and memory of the fibers and the fibers buffer the resiliency of the more resilient particles.

The pad A thus established is an integrated, unitary, durable sheet having substantial and more than adequate strength to be handled and manipulated or worked upon in the course of its being laid and used and affords the desirable characteristics afforded by common jute fiber carpet padding and by common, foam plastic carpet padding, but without the principal shortcomings or disadvantages normally associated with such common carpet paddings.

In furtherance of my invention, it may be advantageous or desirable to assure or enhance the integrity of the pad A. To this end, the fibers F can be fixed together with a suitable cement; the particles can be fused together or secured with a suitable cement or both the fibers and the particles can be secured to each other.

The fibers alone can be glued and secured together by means of a suitable cement which is compatible with the fibers, but is not compatible and will not hold with the plastic. The particles can be fused or secured together by a suitable cement or solvent which is incompatible, or will not hold with the fibers.

It will be apparent that in practice, it is sufficient that either the plastic particles or the fibers be fixed or secured together and that fixing and securing both fibers and particles together would, under ordinary circumstances, be redundant from a mechanical standpoint.

In the event it is deemed necessary that the fibers and the particles be cemented, bonded or fused together, and a suitable cement or bonding agent, which will bond with and hold both the fibers and particles together, is employed, it is preferred that a sufficient quantity of fibers made of the same or a compatible plastic material be added or included in the body of fibers whereby a substantial number of such fibers are engaged with particles upon needle punching and such that they can be subsequently bonded or fused with the particles.

To effect the bonding or fixing of the fibers and/or particles together as described above and as shown in FIG. 7 of the drawings, the pad A is advanced from the means 30 by the conveyor 25 and has a cement or solvent deposited therein as by high pressure spray means S. The pad A is thereafter dried, as by advancing it through a drier D.

The finished, dried padding A, can then be spooled, as indicated at X, or otherwise cut, packaged or bundled for storage, transport and for subsequent use.

Having described only one preferred form and carrying out of my invention, I do not wish to be limited to the specific details herein set forth, but wish to reserve to myself any modifications and/or variations that might appear to those skilled in the art and which fall within the scope of the following claims:

Having described my invention, I claim:

1. A horizontal resilient padding sheet having flat top and bottom surfaces comprising mixed and randomly commingled staple flexible fibers having limited indexes of resiliency and memory, and flexible foam plastic particles having higher indexes of resiliency and memory than the fibers, portions of some of said fibers being turned and drawn into frictional holding and hooked engagement with other of said fibers and into supported and supporting frictional holding engagement about, between, into and through adjacent related particles in the sheet.

2. The sheet set forth in claim 1 wherein most of said fibers are disposed substantially horizontally in the sheet and said turned and drawn portions thereof extend substantially vertically in the sheet.

3. The sheet set forth in claim 2 wherein said turned and drawn portions of said fibers are turned vertically relative to and away from one surface and toward the other surface of the sheet.

4. The sheet set forth in claim 1 wherein said turned and drawn portions of said fibers are turned vertically relative to and away from each surface thereof and toward the other surface of the sheet.

5. The sheet set forth in claim 1 wherein the fibers are bonded together where they occur in contact with each other.

6. The sheet set forth in claim 1 wherein said particles are bonded together where they occur in contact with each other.

7. The sheet set forth in claim 1 wherein said fibers and particles are bonded to adjacent contacting fibers and granules.

* * * * *